United States Patent Office 2,882,249
Patented Apr. 14, 1959

2,882,249

ORGANIC MATERIALS PREPARED WITH THE POLYISOCYANATES AND THEIR PREPARATION

Karl W. Posnansky, Stamford, Conn., assignor to Stamford Rubber Supply Company, Stamford, Conn.

No Drawing. Application January 28, 1955
Serial No. 484,843

9 Claims. (Cl. 260—3)

This invention relates to new synthetic organic plastic materials and their methods of preparation. More specifically, it relates to new plastic products and to methods of preparing them by the treatment of non-linear polymers such as the polyacidesters, and other compounds formed from hydroxy-containing monobasic fatty acids with the organic polyisocyanates.

The treatment of linear polyesters, polyamides and polyesteramides with a polyisocyanate to form plastic materials is known in the chemical art. The synthesis of such products usually involves the initial preparation of a linear polyester polyamide or polyesteramide by reacting a dibasic acid, such as adipic acid, with a glycol, a bi-functional amino alcohol, a diamine, or a mixture of these. This results in a condensation reaction which proceeds with the elimination of water to yield a linear polyester, polyamide or polyesteramide. These compounds are formed from a long chain of molecules of the same type, each joined to its immediate neighbor by an ester or amide linkage and when these long chains of molecules are treated with a polyisocyanate, the isocyanate radicals react with the terminal groups of two or more chains to produce even longer chains. The polyisocyanate may also react with groups containing active hydrogen such as hydroxyl, carboxyl or NH groups, at intermediate points along the chain to cross-link the chains to each other. Thus the polyisocyanate treatment of linear polyesters and polyesteramides performs a chain extending and a cross-linking function. The end products of these modified linear polymers range in properties from soft wax-like materials to hard infusible resinous substances, depending upon the materials and the methods of preparation.

I have found that desirable plastic materials may also be made from the large single, molecules of non-linear polyacidesters prepared from hydroxy-containing monobasic organic acids.

The molecules of these non-linear polymers are not formed from a long chain of similar molecules linked together, but since these acids are monobasic, they are rather large single molecules containing several acid molecules tied together by an ester linkage. These non-linear hydroxy-containing polyacid polymers are either oily, or syrupy liquids, or waxy solids at room temperature. In order to change them to useful plastic materials, I have found that they may be treated with a polyisocyanate. The isocyanate groups react with the active hydrogen of the hydroxy group of the acid to form urethane linkages between the large molecules, thus forming the large heavy polyacid molecules into even larger molecules. The products formed as a result of this additional polymerizing reaction range from soft plastic gels through tough, flexible, elastic films to solid resins.

In my co-pending application, "Organic Plastic Materials Made From Vulcanized Oils and Their Preparation," Serial No. 455,785, filed September 13, 1954, I disclosed that non-linear vulcanized polyesters of long chain unsaturated hydroxy-containing monobasic organic acids could be made into useful plastic products by treatment with a polyisocyanate. This invention deals with the treatment of non-linear polyacidesters and other types of polyacid molecules prepared from hydroxy-containing monobasic fatty acids and a polyisocyanate to form plastic products, without vulcanization. In my prior application, the vulcanized esters which were treated with the polyisocyanates were in general solid elastic substances prior to treatment, and the isocyanate treatment rendered them harder, tougher, and of greater tensile strength. However the materials which are isocyanate treated according to this invention are liquids or soft wax-like materials prior to treatment and because of this, the final products of this invention are generally softer, more flexible and elastic than those described in said co-pending application for similar starting materials.

The use of a polyisocyanate as a polymerizing agent depends principally on the reaction of the isocyanate radical with an active hydrogen. The reaction between the isocyanate radical and the hydroxy group, for example, is known in organic qualitative analysis where it is used to prepare solid derivatives of alcohol and amines. Diisocyanates having an isocyanate radical at each end of the molecule will react with compounds having hydroxy groups to form polyurethane linkages between the molecules of a hydroxy-containing compound. This formation of cross-linking bridges creates large organic molecules. It is this reaction between a polyisocyanate and the hydroxy groups on the acid molecules of the non-linear polymers which this invention utilizes in the preparation of the new products prepared in accordance therewith.

Accordingly it is an object of this invention to prepare polyurethanes by treating the non-linear polyacidesters of a long chain hydroxy-containing organic fatty acid with a polyisocyanate. A further object of this invention is to provide new synthetic organic plastic products which are tough, elastic, flexible, and solvent resistant. A further object is to provide new synthetic organic plastic materials exhibiting adhesive qualities. A still further object is to provide new synthetic organic plastic materials useful as adhesive-repellant coatings. Another object is to provide new synthetic materials which are useful as compounding ingredients for natural and synthetic rubbers, vinyl, and other plastics. Still another object of this invention is to prepare solvent resistant putties. Other objects of this invention will in part be obvious and will in part appear hereinafter.

The invention accordingly comprises the several steps and the relation of one or more such steps with respect to each of the others, and the composition possessing the features, properties, and the relations of constituents which are exemplified in the following detailed disclosure, and the scope of the invention will be indicated in the claims.

In preparing the new products of this invention, the process comprises two major steps. In the first of these a hydroxy-containing monobasic organic acid is treated to form a polyacid molecule such as a non-linear polyacidester. In the second step large organic molecules of this first step are treated with a polyisocyanate to form the new and useful plastic material of this invention. The hydroxy-containing monobasic fatty acids which are the starting materials of this invention may be either saturated or unsaturated, and may be either naturally occurring or artificially synthesized.

In order to form the materials which are to be treated with polyisocyanate, several of the hydroxy-containing molecules of the fatty acid must be combined into a non-linear ester or other form of non-linear polyacid polymer. Non-linear polyesters may be formed by a reaction between the free acid and one or more of the polyhydric alcohols. Esterification may also take place with other substances having esterifiable groups, such as epoxy resins or epoxylated oils, or other materials. The products prepared according to these methods are then treated with the di- or polyisocyanates, either directly or in solution, to form the useful products of this invention.

The products resulting from the second step range from soft plastic gels to tough flexible elastic films, depending upon the kind of polyacid molecule, the number of acid molecules which are joined, the type and amount of polyisocyanate with which it is treated and the reaction conditions. One property which is common to all of the products of this invention is a high resistance to the action of chemical solvents. These products have many uses including clear, tough, flexible coatings, self-supporting films or sheets, molding materials solvent resistant putties, adhesive materials, and conversely adhesive-repellant coatings. Some of the products intermediate in physical properties between the two extremes can be used as compounding ingredients or fillers for rubber, both natural and synthetic, vinyls, and other plastic materials. The particular advantage of the materials of this invention for this application is although similar in effect to vulcanized oils, they can be made sulphur-free. Thus they may be compounded into products where the presence of sulphurized compounds is undesirable, as when the compounded materials are to be used in contact with metals like silver, copper or mercury.

To describe the invention more specifically, the initial step in the preparation of these new products is to manufacture a non-linear polymer from a long chain hydroxy-containing monobasic fatty acid. It is desirable that the acids which form the organic molecule be of the long chain type in order to obtain large molecules and, as used in this application, the term "long chain" organic acid includes all organic acids having more than six carbon atoms per molecule. The acid molecule should also contain an active hydroxy group so that the polyacid molecules made from the acid, when treated with a di- or polyisocyanate, will contain active hydrogen for reaction with the isocyanate group. Mono-hydroxy acids are preferred for use in this invention, in order that when the isocyanate is added to the polyacid molecules formed from the acids, all of the relatively expensive isocyanate will be used in cross-linking the polyacid molecules, and not in cross-linking two or more hydroxy groups on the same acid molecule.

Ricinoleic acid is a typical naturally occurring long chain mono-hydroxy monobasic fatty acid which can be used as a starting acid. Other fatty acids which do not normally contain a hydroxy group, such as caproic, myristic, palmitic, stearic, oleic or linoleic acid may be artificially-hydroxylated by known methods for use in making the products of the invention. Ricinoleic acid however, is a preferred material since it is a relatively long chain acid, containing eighteen carbon atoms per molecule, and it does not have to be artificially hydroxylated. Thus, although the artificially hydroxylated fatty acids are suitable, ricinoleic acid has the advantages of economy and availability.

The products of this invention may be made from either saturated or unsaturated acids. Thus hydrogenated ricinoleic acid (12-hydroxy stearic acid) is fully saturated, and it may be used to form non-linear polyacid polymers for treatment with the isocyanates according to this invention.

In addition to the esters made from polyhydric alcohols as described above, polyacidesters useful in this invention may be made from chemical compounds which are not true alcohols. The esterifiable groups of these chemical compounds are not necessarily hydroxy groups, but can be, for example, reactive epoxy groups. One class of materials which can be used to form polyacidesters by the reaction between the carboxyl group of fatty acids and epoxy groups are the epichlorohydrin polyol condensates. These materials have both esterifiable hydroxy and epoxy groups. They are made in various chain lengths and range from liquids at the lower molecular weights to fusible resins at the higher molecular weights. Depending upon the chain length, they may esterify several acid molecules.

In addition to using epoxy resins of this type to form the polyacid molecules useful in this invention, it is also possible to epoxylate unsaturated acids and the esters of such acids. Thus if soybean oil, which is a naturally occurring ester of unsaturated fatty acids, is epoxylated, there will be at least one epoxy group per acid molecule. Since soybean oil is a glyceride, this means that each molecule of the oil will have about three epoxy groups. These epoxy groups are esterifiable and thus may be used to esterify a long chain monobasic fatty acid. One advantage of using an epoxylated ester of this type in place of an alcohol to esterify the fatty acids is that the molecule is made much larger and heavier because of the higher molecular weight of the epoxylated ester. This results in large organic molecules with a greater molecular weight than is in general achieved by esterifying with the polyhydric alcohols. These very large molecules formed by esterification of the fatty acids with epoxylated oils still contain approximately three hydroxy groups per molecule. However, because of the relatively small number of hydroxy groups per molecular weight, the mol equivalent amounts of isocyanate used to combine with these hydroxy groups to form the polyurethanes of the invention are a considerably smaller percentage of the total weight than in most other esters.

All of the methods described for joining the free fatty acid molecules into larger molecules are of such a nature that the hydroxy group attached to the fatty acid is not substantially affected by the process. Thus active hydrogen is available for reaction with the isocyanate groups of the polyisocyanates.

Examples of polyisocyanates which can be used for treatment of the previously prepared materials are m-tolylene diisocyanate, methyl phenyl diisocyanate, diethyl methane diisocyanate, 3,3-dimethyl-4,4-diphenylene(bitolylene)diisocyanate, 3,3 - dimethoxy - 4,4 - diphenylene (dianisidine)diisocyanate, 2,3 - dimethyltetramethylene diisocyanate, 2-chlorotrimethylene diisocyanate, and triphenyl methane triisocyanate. As previously explained the polyisocyanate reacts with the hydroxy groups to form a polyurethane linkage between the large organic molecules formed by any one of the above described processes. This reaction takes place between each of the reactive groups of the polyisocyanate molecules and the hydroxy groups. The result is additional cross-linking at the hydroxy group of the polyacid molecule. Thus the final products, besides containing the original ester, or other linkages, now contain urethane linkages which cause polymerization of the original molecules to form a solid product.

The amount of isocyanate used for treating the polyacidesters or other polyacid materials can be calculated from the number of hydroxy groups per molecular weight of the prepared material and the number of isocyanate groups per molecular weight of the organic polyisocyanate. As will be noted in the examples, the products prepared according to this invention use approximately mol equivalent amounts of the isocyanate, i.e. an amount of polyisocyanate is added to the polyacid material which is sufficient to react all of the hydroxy groups attached to the acids of the polyacid molecules. If a softer product is desired, less than mol equivalent amounts of isocyanate may be added; conversely if a harder product is desired more than this amount may be added. However, the polyisocyanates are relatively more expensive than the non-linear polyacid polymers. Therefore if a harder product is desired, it is preferable from an economic standpoint to prepare a polyester from an epoxy resin which will tie up more acid molecules and thus achieve a product with higher molecular weight at the conclusion of the first step, rather than use additional amounts of isocyanate. Present information indicates that the greater hardness of the products which results when excess amounts of isocyanate are used occurs because of the reaction of the isocyanate with other residual groups, or with moisture rather than with the substance which is being treated.

The organic radical associated with the polyisocyanate has an effect upon the resulting product, as does the number of isocyanate groups per molecule. I have found for example that, all other conditions being the same, diphenyl methane diisocyanate or dianisidine diisocyanate will give a harder product than m-tolylene diisocyanate. Triphenyl methane triisocyanate will yield an even harder product because of its three reactive groups. In some applications, in order to obtain particular properties in the final product, it may be desirable to use a solution of two different polyisocyanates as the polymerizing agent.

The mixing of the polyisocyanate with the polyacidesters is accomplished by mixing them directly if both are in liquid form. If the products to be treated are in solid form they may be liquified by heating, or by putting them in solution. For example the polyacidesters may be dissolved by the addition of ketone solvents such as methyl ketone, methyl ethyl ketone or methyl isobutyl ketone, chlorinated solvents such as chloroform, or trichloroethylene or aromatic solvents such as benzene, toluene, or xylene or blends of several of these solvents. If the diisocyanate is in solid form it may be put in solution by using solvents such as toluene; when it is desired to prepare a coating, or a dipping compound from the finished product, it is preferable that the reacting materials be in solution because they are thinner and also in order that the reaction will not proceed too rapidly and there will be sufficient time to coat the product over the material to be covered before it solidifies. The reaction between the treated materials and the polyisocyanates will take place at room temperature. However, the reaction may be speeded up by heating and in some cases heat is necessary to complete the reaction within a reasonable time. Heating is also useful to completely or speedily remove a solvent, if solutions as described above are used. The presence of moisture, while possibly having an influence on the speed and completion of the reaction, does not at this stage appear necessary. Heating also appears to make the product harder, more solid and of greater tensile strength. This heating is preferably accomplished by exposing solutions or mixtures of the treated materials and the polyisocyanates to temperatures of 70° C. to 80° C. or higher in an oven for a period of a few hours.

Some of the products intermediate in hardness between the soft gels and the very hard coating materials made from the polyesters can be used as compounding ingredients for rubber, synthetic rubber, vinyl and other plastics. In this application they are used as processing aids, softeners, or modifiers in the same way that solid vulcanized oils are used. These products are particularly advantageous for this use since they contain no sulphur; therefore they can be used in products where the presence of sulphurized compounds is undesirable, as with materials used in contact with heavy metals.

The products to be compounded are comminuted to a powder or granular form, and usually mixed with the rubber or rubber-like products during the initial processing when other necessary ingredients are added. The products of this invention make the rubber easier to process in subsequent molding, calendering or extruding operations and they also impart softness and flexibility to the finished product and reduce cold flow.

While these products, after comminution, may be mixed directly with the rubber as described above, should it be desired to add some of the harder products to rubber which are less easily comminuted, it is possible to add the reactants to the rubber mix and allow them to react during the rubber processing and prior to curing. Thus certain of the higher esters and polyisocyanates may be added with the other additives. The esters and the polyisocyanate react during the processing of the rubber to form the compounds of this invention and thus modify the processing and properties of the final rubber product.

Most of the products made according to this invention are considerably softer than those made from vulcanized oil treated according to my co-pending application and can be used in blends with the vulcanized oil polyurethanes for softening and other modifying purposes. This blending may take place when the materials are in the liquid stage prior to hardening after treatment with the polyisocyanate, but I prefer to blend the vulcanized oil and the non-linear polymers prior to treatment with the polyisocyanate. Using this method, it is possible to prepare products which are intermediate in hardness between those prepared according to my previous invention and those prepared according to this invention.

Certain of the products of this invention require moderate heating in order to complete the reaction. Consequently such products can be pigmented and used as paints, the pigments and solvents if desirable being added either before or after isocyanate treatment.

Although the invention has been described as the treatment of non-linear polyacid polymers prepared in accordance with the previous description with a polyisocyanate, any compound having the general formula $R(CNX)_z$ where R is a polyvalent organic radical, X is oxygen or sulphur, i.e. a group VI element of atomic weight less than 33, and z is an integer more than one could be used. Thus the invention includes products made from di- and polyisothiocyanates, and from compounds which include both isocyanate and isothiocyanate groups, in addition to those made from the polyisocyanates.

The making of the polyacid molecules from the acid starting materials and the treatment of the resulting non-linear polyacidesters and other non-linear polyacid materials with the polyisocyanate to form the new products of this invention is illustrated in the following examples, to which however the invention is not limited.

EXAMPLE I

A mixture of 1,000 parts of an epichlorohydrin polyol condensate having two epoxy groups and an occasional hydroxy group per molecule are esterified with approximately 1,800 parts of ricinoleic acid by the esterification procedure described in previous examples, until a low acid number indicates that esterification is substantially complete.

100 parts of this ester are dissolved in an equal amount of toluene and 19 parts of tolylene diisocyanate are added to the solution. This mixture is poured on a glass or other flat plate and after evaporation of the solvent and an additional period of moderate heating, a glass clear flexible scratch proof film having a tensile strength of 1,500 to 2,000 lbs. per square inch is obtained. This example can also be performed with the addition of 900 parts of linseed oil fatty acids to the above ingredients in the esterification process. This slows down the reaction with the isocyanate, and increases the flexibility of the product. The drying oil component permits the material to polymerize further on exposure to air.

EXAMPLE II

A mixture of 500 parts of ricinoleic acid and 500 parts of epoxylated soybean oil are esterified by the usual method at a temperature of approximately 200° C. A mixture of 100 parts of this ester and 12.5 parts of tolylene diisocyanate give a clear, soft, thermoplastic, solid rubbery product of low tensile strength after a period of moderate heating. If the ester-isocyanate mixture is heated in bulk, the resulting product is a friable solid which can be used for molded articles, comminuted for rubber compounding, or cut up in squares for use as pencil erasers.

GROUP I

*Materials used in rubber compounding*

EXAMPLE III

The following ingredients are mixed on a rubber mill in the proportions given:

| | Parts |
|---|---|
| Smoked sheet (natural rubber) | 100 |
| Zinc oxide | 5 |
| 2-mercaptobenzothiazole | 1 |
| Di-ortho-toyly guanidine | 0.5 |
| Sulfur | 3 |
| Stearic acid | 0.5 |

In addition, the products of this invention are added as modifiers in the proportions given in the following table. The mixture is press cured in a mold for 8 minutes at 45 pounds steam pressure and the resulting rubber product has the properties indicated in the following table:

| Modifier | Durometer Hardness | Modulus @300% Elongation, p.s.i. | Elongation at Break, Percent | Tensile Strength at Break, p.s.i. |
|---|---|---|---|---|
| 1. 25 parts of epoxylated soybean oil ester with ricinoleic acid modified with tolylene diisocyanate (Example II) | 38 | 380 | 700 | 2,800 |

Thus I have described a method of preparing new organic polymeric materials by treating the non-linear polyacid esters or other non-linear polyacid polymers of long chain hydroxy-containing monobasic organic acids with a polyisocyanate or polyisothiocyanate. Wherever in the specification and the claims the word "polyisocyanate" or "polyisothiocyanate" is used, it is to be interpreted to include the diisocyanates and diisothiocyanates respectively as well as higher isocyanates or isothiocyanates.

It will thus be seen that the objects set forth above, among those made apparent from the preceding description, are efficiently attained and, since certain changes may be made in carrying out the above process and in the articles set forth without departing from the scope of the invention, it is intended that all matter contained in the above description shall be interpreted as illustrative and not in a limiting sense. Particularly, it is to be understood that the claimed ingredients or compounds recited herein in the singular are intended to include compatible mixtures of such ingredients whenever the sense permits.

Having described my invention, what I claim as new and desire to secure by Letters Patent is:

1. An organic plastic material which is the reaction product of an organic polyisocyanate having a plurality of isocyanate groups per molecule as its sole reactive groups, and a non-linear polymer prepared by esterifying a monobasic aliphatic long chain free fatty acid containing an alcoholic hydroxy group separate from the acid group, with a polyepoxy compound having a plurality of esterifiable 1,2-epoxy groups per molecule.

2. An organic plastic material which is the reaction product of an organic polyisocyanate having a plurality of isocyanate groups per molecule as its sole reactive groups, and a non-linear polymer prepared by esterifying ricinoleic acid with a polyepoxy compound having a plurality of esterifiable 1,3-epoxy groups per molecule.

3. An organic plastic material which is the reaction product of an organic polyisocyanate having a plurality of isocyanate groups per molecule as its sole reactive groups, and a mixed ester prepared by esterifying a mixture of a plurality of organic fatty acids, said mixture containing at least two thirds by weight of a monobasic, aliphatic, long chain, free fatty acid containing an alcoholic hydroxy group separate from the acid group, with a polyepoxy compound having a plurality of esterifiable 1,2-epoxy groups per molecule.

4. An organic plastic material which is the reaction product of an organic polyisocyanate having a plurality of isocyanate groups per molecule as its sole reacting groups, and a non-linear polymer prepared by esterifying a monobasic, long chain, aliphatic saturated free fatty acid containing an alcoholic hydroxy group separate from the acid group, with an epoxy compound having a plurality of esterifiable 1,2-epoxy groups per molecule.

5. An organic plastic material which is the reaction product of an organic polyisocyanate having a plurality of isocyanate groups per molecule as its sole reactive groups, and a mixed ester prepared by esterifying a mixture of ricinoleic acid and one-third by weight of free linseed oil fatty acids, said mixture containing at least substantially two-thirds by weight of said ricinoleic acid with a polyepoxy compound having a plurality of esterifiable 1,2-epoxy groups per molecule.

6. An organic plastic material which is the reaction product of an organic polyisocyanate having a plurality of isocyanate groups per molecule as its sole reactive groups, and a non-linear polymer prepared by esterifying a monobasic, aliphatic, long chain, fatty acid containing an alcoholic hydroxy group separate from the acid group, with an epoxylated organic fatty oil, said oil having a plurality of esterifiable 1,2-epoxy groups per molecule.

7. An organic plastic material which is the reaction product of an organic polyisocyanate having a plurality of isocyanate groups per molecule as its sole reactive groups, and a non-linear polymer prepared by esterifying ricinoleic acid with epoxylated soya bean oil.

8. A method of modifying a rubber composition selected from the group consisting of natural rubber, synthetic rubber and mixtures thereof which comprise the steps of mixing with the polymeric compound a non-linear polymer prepared by esterifying a monobasic, aliphatic, long chain, free fatty acid containing an alcoholic hydroxy group separate from the acid group, with a polyepoxy compound having a plurality of esterifiable 1,2-epoxy groups per molecule, and adding to the mixture thus obtained an organic polyisocyanate having a plurality of isocyanate groups per molecule as its sole reactive groups.

9. In a method of processing a rubber composition selected from the group consisting of natural rubber, synthetic rubber and mixtures thereof, the step of adding to the materials to be processed prior to curing the reaction product of an organic polyisocyanate having a plurality of isocyanate groups per molecule as its sole reactive groups and a non-linear polymer prepared by esterifying a monobasic, aliphatic, long chain, free fatty acid containing an alcoholic hydroxy group separate from the acid group, with an epoxy-containing esterifying agent having a plurality of esterifiable 1,2-epoxy groups per molecule.

(References on following page)

References Cited in the file of this patent

UNITED STATES PATENTS

| | | |
|---|---|---|
| 2,282,827 | Rothrock | Mar. 12, 1942 |
| 2,556,145 | Niederhauser | June 5, 1951 |
| 2,577,281 | Simon | Dec. 4, 1951 |
| 2,609,249 | Cass | Sept. 2, 1952 |
| 2,645,623 | Hermann | July 14, 1953 |
| 2,759,901 | Greenlee | Aug. 21, 1956 |
| 2,788,335 | Barthel | Apr. 9, 1957 |

OTHER REFERENCES

Chemical Engineering, vol. 57, No. 4, April 1950, pages 165, 166. Copy in Scientific Library.

"The Van Nostrand Chemist's Dictionary," pp. 367–8, D. Van Nostrand Co., Inc., N.Y. 1953. (Copy in Scientific Library.)

Heiss et al.: Ind. and Eng. Chem., July 1954, pages 1498–1503.